3,585,011
ARTICLE WELDED BY FERRITIC ALLOY
Stephen J. Matas, Independence, and John Savas, Brecksville, Ohio, assignors to Republic Steel Corporation, Cleveland, Ohio
No Drawing. Filed May 13, 1968, Ser. No. 728,798
Int. Cl. B32b 15/00
U.S. Cl. 29—196.1
3 Claims

ABSTRACT OF THE DISCLOSURE

Base metal components welded together by a ferric welding alloy consisting essentially of about: 0.08 to 0.24% carbon, 5 to 14% nickel, 0 to 8% cobalt, 0.1 to 2.5% chromium, 0.1 to 1.25% molybdenum, 0 to 1.25% manganese, 0 to 0.40% silicon, and 0 to 0.30% vanadium, balance substantially iron and wherein the ratio of Cr to Mo is greater than 1 to 1 when Ni is less than about 8.2 percent.

---

This invention relates to novel consumable, ferritic, welding alloys for arc welding and more particularly to welding wire made therefrom and welded articles produced therewith.

Alloy steels find use in a wide variety of applications depending on the physical properties of the steels and the use environment of the final product. A particularly tough, high strength, stress and corrosion-resistant series of alloy steels known as HP 9–4–25 and HP 9–4–20 have element concentrations within the ranges of: 0.1–0.30% carbon, 7.0–9.5% nickel, 3.5–4.5% cobalt, 0.35–1.10% each of chromium and molybdenum, 0.10–0.35% manganese, 0.06–0.12% vanadium, up to 0.10% silicon, up to 0.010% each of sulfur and phosphorus, balance iron except for extraneous impurities within commercial tolerances.

These steels as hot-worked, normalized, austenitized, quenched and tempered at about 1000° F., have excellent ductility characteristics and other favorable mechanical properties some of which, for plate, are: ultimate strength, 190,000 to 200,000 p.s.i.; 0.2% offset yield strength, 180,000 to 190,000 p.s.i.; tensile elongation in 1 inch, 16%; reduction in area, 60%; and Charpy V-notch impact strength, 35 to 55 ft.-lbs. at 70° F. and 30–40 at −80° F. These steels and their processing and heat treatment, are described in Pat. No. 3,366,471, Hill et al.

Because of their high strength and toughness, these steels are particularly adapted for use in large, unfired, pressure vessels subjected in use to high stresses, such as hydraulic bottles, and by reason of their corrosion-resistance as well, for use in certain chemical pressure vessels and for the hulls of submersible vessels and the like; exposed to sea water.

A serious problem has been encountered, however, in joining work pieces of these steels; such as plates, sheets, and the like; by welding into a fluid-tight joint. It has been sought to achieve the welding without impairing the strength, ductility and toughness of the steel at the weld seams in absence of subsequent heat treatment. In some applications subsequent heating is efficacious in order to provide stress-relief treatment of the weldment. Typically, such treatment involves tempering at elevated temperatures of about 1000° F. for periods up to 24 hours. Unfortunately, difficulty has been experienced with certain weld alloys heretofore employed and subjected to stress-relief treatment in that the heat treated product is rendered extremely brittle in the welded seam and offers low resistance to impact. This embrittling effect is manifested by differences in Charpy V-notch characteristics with substantial reductions in impact resistance being evidenced as compared to the untreated weldment, with increasing times at the stress-relieving temperatures.

The problem therefore becomes one of providing a consumable filler or welding wire of a composition which will form a weldment that will, in the first instance, have a strength, toughness and ductility at least equal to that of the base metal; will retain these characteristics upon subsequent stress-relief heat treatment; and will resist the embrittling effect normally encountered as a result of the heat treatment. In accordance with the present invention, it has been discovered that these purposes will be achieved by fusion welding using a consumable filler or welding wire of compositions to be more fully recited hereinafter. Suitable welding means such as that of a tungsten electrode arc operating in an atmosphere or blanket of an inert gas, such as argon, generally designated as "gas-tungsten-arc" or "TIG" welding may be used.

The novel weldable alloys of the invention which have been discovered to possess a high degree of resistance to embrittling upon stress-relief treatment are of the following compositions:

| | Percent |
|---|---|
| C | 0.08–0.24 |
| Mn | 0–1.25 |
| Si | 0–0.40 |
| Ni | 5.0–14.0 |
| Co | 0–8.0 |
| Cr | 0.1–2.50 |
| Mo | 0.1–1.25 |
| V | 0–0.30 | balance substantially iron, and wherein the ratio of Cr to Mo is greater than 1:1 when Ni is less than 8.2%, and more preferably wherein the ratio of chromium to molybdenum is such that the ratio of $$Mo\%(Cr\%+Mo\%)/Cr\%$$

is substantially equal to or less than unity. This ratio termed the "embrittlement factor" will be referred to more particularly hereinafter. Preferably the alloys of the invention will also contain at least 0.1% each of Mn and Si.

It has been discovered that the embrittling resistance effect is to a large extent dependent upon the relative and total amounts of chromium and molybdenum present with respect to each other and to the amount of nickel present, within the ranges above recited. For example, for nickel concentrations in the low region of the range, i.e., up to around 8.2%, Cr:Mo ratios of unity or less generally result in markedly embrittled stress-relieved weldments with decreases in Charpy V-notch (CVN) values of as much as 60% or more being observed. In accordance with the invention however, these embrittling factors can be greatly minimized or eliminated by utilizing a Cr:Mo ratio of at least 1.2:1 and preferably from 1.5–3:1. At nickel levels above 8.2 percent, Cr:Mo ratios can be unity or less, but it is preferred to operate at between 1.2–3:1 and preferably from 1.5–2.5:1.

With respect to the above alloy composition, several points, having to do with the actual levels of elements employed within the recited ranges are noteworthy. While the recited levels give the permissible ranges for the compositions, the particular amount of an individual element actually employed may influence the effect that the other elements exert. The levels are thus somewhat interrelated in the sense that utilization of some at their extreme levels is ordinarily best accompanied by other elements at the opposite extreme of utilization. The metals displaying the most sensitivity in this area as regards ultimate properties are nickel, chromium, molybdenum and silicon; and to a lesser degree manganese and cobalt. For example, operation at the high nickel levels is desirably accompanied by a greater tolerance for chromium and molybdenum, but only when accompanied by low cobalt levels. On the other hand, at low nickel levels the effect of manganese and silicon at the higher ends of their respective ranges is particularly detrimental. Within the intermediate regions of the various ranges, the sensitivity of each element is less pronounced.

Preferred among the foregoing compositions are those wherein any one or more of the elements, and especially those of carbon, nickel, manganese, chromium and molybdenum are employed at concentration levels within the following composition limits:

|  | Percent |
|---|---|
| C | 0.12–0.20 |
| Mn | 0.40–0.90 |
| Si | 0.15–0.35 |
| Ni | 8.0–12.0 |
| Co | 2.0–6.0 |
| Cr | 0.50–1.20 |
| Mo | 0.30–0.80 |
| V | 0.06–0.24 | and the balance substantially iron. Such compositions generally result in a substantially uniformity of resistance to embrittlement although the actual extent of such will vary. Best results are obtained when the manganese, silicon, and carbon, are employed at the lower ends of their respective ranges. In general, the resulting weldments display good mechanical properties in the as-deposited form, as well as after being subjected to stress-relief treatment of 1000° F. for cycles of up to 24 hours, but improvement in impact resistance for a particular selection of variables where desired can often be achieved by using somewhat shorter heating cycles for stress-relief treatment.

Chromium and molybdenum are employed at levels sufficient to provide Cr:Mo ratios preferably in excess of unity, with an optimum between 1.2 and 3:1. Good resistance however, is noted even at the 1:1 ratios especially when the carbon level is utilized near the lower end of its range. At levels close to unity for Cr:Mo ratios, resistance to embrittling is somewhat related to cobalt level and thus it is preferred that at such ratios the cobalt be employed at levels in the low to middle range recited rather than at the upper level.

Yet further concentration ranges, and indeed those which are most preferred in practising the present invention, are the following:

|  | Percent |
|---|---|
| C | 0.14–0.18 |
| Mn | 0.50–0.60 |
| Si | 0.20–0.30 |
| Ni | 9.5–10.5 |
| Co | 3.5–4.0 |
| Cr | 0.75–0.95 |
| Mo | 0.40–0.50 |
| V | 0.12–0.18 |

The compositions of the invention desirably utilize these levels for the appropriate elements although any of the ranges previously recited may be employed as well for any one or more of the elements. It is preferred, however, that carbon, nickel, chromium and molybdenum are employed at these levels. Such compositions demonstrate best resistance to embrittling, in many cases there being no change in CVN values and in some cases there being an actual increase in the impact resistance.

Within such ranges, Cr:Mo ratios range from 1.5–2.4:1 with best results are obtained at ratios around 1.8–2.2:1. Yet a further improvement in the response to stress-relief is obtained when silicon is held at between 0.20 to 0.25 when the C, Mn, Co, Cr and Mo are on the high side of their respective ranges.

The silicon range of .20–30 percent, as shown in the most preferred composition ranges above, is for purposes of enhancing the fluidity and de-oxidation characteristics of the weld metal upon deposition. For optimum mechanical properties under impact conditions, and for optimum non-embrittling characteristics, it is to be understood that lesser amounts of silicon as in the range of 0 to .20 percent, would be preferable. Also the use of other deoxidation agents, such as Ti, Zr, Al or Cb, or other such elements in lieu of Si, to improve the weldability of alloys within the broad composition ranges of this disclosure, are within the scope of the invention.

Markedly improved CVN characteristics after stress-relief are obtained from alloy compositions within the element ranges indicated above. Welded articles are thus obtained having mechanical properties generally at least as good as the mechanical properties of the starting base metal both before and after stress-relief, thus conveying a substantial benefit in impact resistance without sacrificing other physical properties appreciably, if at all. For example, such alloys have good weldability, high strength, usually of the order of 180 K s.i. yield strength, in both as-deposited and post-stress-relief conditions, and generally high impact strengths usually around 50 ft.-lbs. or higher, before and after stress-relief.

In the tables which follow, comparisons are presented between Charpy V-notch values determined on a weldment in the as-deposited form, relative to that obtained after stress-relief treatment at 1000° F. for 24 hours, (unless a shorter time is indicated). Weld-wire heats were made utilizing the indicated melting practice and ⅛″ square strips fashioned therefrom. Weldments were made on 1″ thick plate in single U-groove fashion. Test specimens were cut from the central portions of the undiluted face side of the weldment. In the Charpy V-notch impact tests, the specimens were notched perpendicular to the face side of the weldment and the tests carried out at the indicated temperatures.

In each case, the base metal was within the following composition range:

|  | Percent |
|---|---|
| C | .17–.30 |
| Mn | .10–.35 |
| Si | 0.01–0.10 |
| Ni | 7.0–9.5 |
| Co | 3.5–4.5 |
| Cr | 0.35–1.10 |
| Mo | 0.35–1.10 |
| V | 0.01–0.12 |

The following Tables I–V inc. are illustrative of particular compositions productive of embrittling vis-a-vis non-embrittling weld metal compositions.

TABLE I

Weld No. HP 211, Heat No. 3888748, Vacuum Melt

| C | Mn | Si | P | S | Ni | Co | Cr | Mo | V |
|---|---|---|---|---|---|---|---|---|---|
| .19 | 1.09 | .33 | .010 | .005 | 7.3 | 3 5 | 0 51 | 98 | 0 03 |

Weld Metal Characteristics

| | Y.S., K s.i. | T.S., K s.i. | R.A., percent | Elongation, percent in 1″ | Charpy V-notch, ft.-lbs. −80° F. | 30° F |
|---|---|---|---|---|---|---|
| As deposited | 187 | 211 | 55 | 16 | 39 | 44 |
| After stress relief | | | | | | 5 |

As can be seen, a marked embrittling effect, as manifested by a substantial reduction (about 89%) in the CVN value, is observed in the above weldment due primarily to the Cr:Mo ratio being substantially less than unity in association with a nickel concentration at the low end of the range hereinabove recited and relatively high Mn and Si. It will further be noted that the embrittling factor Mo percent (Cr percent+Mo percent)/Cr percent—in this example is 2.86, or considerably greater than unity. Hence by this criterion it can be determined in advance of testing that the weldment would be embrittled by the stress relieving heat treatment as applied to the relatively low nickel alloy of the test.

The embrittling effect is somewhat reduced by lowering the Mn and Si contents which simultaneously improves impact strength. This is seen in Table II below.

TABLE II
Weld No. HP 242, Heat No. 60320, Vacuum Induction Melt

| C | Mn | Si | P | S | Ni | Co | Cr | Mo | V |
|---|---|---|---|---|---|---|---|---|---|
| .18 | .80 | .23 | .003 | .005 | 7.3 | 3.4 | .47 | .98 | .09 |

Weld Metal Characteristics

| | Y.S., K s.i. | T.S., K s.i. | R.A., percent | Elongation, percent in 1" | Charpy V-notch, ft.-lbs, | |
|---|---|---|---|---|---|---|
| | | | | | −80° F. | 30° F. |
| As deposited | 197 | 206 | 63 | 22 | 56 | 67 |
| After stress relief | | | | | 31 | 25 |

Here also the Cr:Mo ratio is considerably less than unity and the embrittling factor correspondingly greater than unity resulting in a loss of toughness in stress relieving heat treatment, the difference being designated herein as CVN. In this case the ratio of Cr:Mo is 0.47 and the embrittling factor equated to CVN, henceforth to be referred to as the CVN ratio, is 3.02.

When the Cr:Mo ratio is raised above unity and the embrittling factor correspondingly reduced below unity, and with further reductions of Mn and Si, even with a relatively low Ni content, a non-embrittling alloy is obtained as determined on a sub-size simulated weld specimen having the following compositions:

Heat No. P976:
C ............................................................. .19
Mn ........................................................... .50
Si ............................................................ 0.15
Ni ............................................................ 7.9
Co ........................................................... 4.2
Cr ............................................................ 0.89
Mo ........................................................... .51
V ............................................................. .12

Impact (in.-lbs.) 70° F.
As cast ................................................... 60,70
1000° F., 24 hours ................................ 74,77

In this case the ratio Cr:Mo is 1.75 and CVN ratio is .802.

Table III below shows a weldment having a Cr:Mo ratio of about 1.8:1, and relatively low Mn and Si which has good mechanical properties and is non-embrittled after stress-relief.

TABLE III
Weld No. HP-240, Heat No. V459, Vacuum Induction Melt

| C | Mn | Si | P | S | Ni | Co | Cr | Mo | V |
|---|---|---|---|---|---|---|---|---|---|
| 0.14 | 0.45 | 0.08 | | | 9.6 | 2.0 | .74 | .40 | .16 |

Weld Metal Characteristics

| | Y.S., K s.i. | T.S., K s.i. | R.A., percent | Elongation, percent in 1" | Charpy V-notch, ft.-lbs. | |
|---|---|---|---|---|---|---|
| | | | | | −80° F. | 30° F. |
| As deposited | | | | | | 71 |
| After stress relief | 184 | 192 | 63 | 18 | 71 | 75 |

NOTE.—The Cr:Mo ratio is 1.85 and CVN ratio is 0.616.

Similar results are obtained at somewhat higher Si levels added to improve weldability, and a higher Co level to improve strength as shown in Table IV.

TABLE IV
Weld No. HP-308, Heat No. 60509, Vacuum Induction Melt

| C | Mn | Si | P | S | Ni | Co | Cr | Mo | V |
|---|---|---|---|---|---|---|---|---|---|
| 0.15 | .41 | .20 | .008 | .005 | 10.1 | 3.7 | 1.07 | .47 | .07 |

Weld Metal Characteristics

| | Y.S., K s.i. | T.S., K s.i. | R.A., percent | Elongation, percent in 1" | Charpy V-notch, ft.-lbs. | |
|---|---|---|---|---|---|---|
| | | | | | −80° F. | 30° F. |
| As deposited | 186 | 213 | 64 | 15 | 61 | 66 |
| After stress relief: | | | | | | |
| 8 hrs | | | | | 53 | 71 |
| 24 hrs | 193 | 196 | 66 | 18 | 58 | 78 |

NOTE.—Here the Cr:Mo ratio is 2.28 and the CVN ratio is 0.676.

Table V below shows the effect of operating below a Cr:Mo ratio of unity in the presence of high Ni to obtain a substantially non-embrittling weldment.

TABLE V
Weld No. HP-263, Heat No. B-137, Air Induction Melt

| C | Mn | Si | P | S | Ni | Co | Cr | Mo | V |
|---|---|---|---|---|---|---|---|---|---|
| .15 | .74 | .19 | | | 11.2 | 3.9 | .57 | 1.00 | .09 |

Weld Metal Characteristics

| | Y.S., K s.i. | T.S., K s.i. | R.A., percent | Elongation, percent in 1" | Charpy V-notch, ft.-lbs. | |
|---|---|---|---|---|---|---|
| | | | | | −80° F. | 30° F. |
| As deposited | 171 | 211 | 62 | 19 | 47 | 52 |
| After stress relief | 189 | 204 | 65 | 19 | 41 | 50 |

In this case although the Cr:Mo ratio is 0.57 and the CVN ratio is 2.76, the high nickel content in the alloy offsets the embrittling tendencies otherwise indicated by these ratios which apply particularly to alloys containing under 8.2% Ni. But even with higher nickel contents it is nevertheless advantageous to maintain the Cr:Mo ratio at unity or higher.

Presented below in Table VI is a compilation of various weld compositions together with the CVN values obtained before and after stress-relief. In each case where tensile data were developed for the various weldments, the stress-relieved weld metal properties showed no substantial deviation from the as-deposited weld properties, as is shown in Table VII. All the weld metal heats presented in Table VI with a "B" number designation were melted as 150# air induction melts, some of which were parts of split heats which were thus melted for comparison purposes to determine the effects of various elements on their properties.

Reference to Table VIII below shows the essential absence of effect on other mechanical properties after stress-relief treatment at 1000° F. for 24 hours.

TABLE VI

| Weld No. | Heat No. | Analysis of filler wire | | | | | | | | CVN, ft.-lbs. | | Weld metal condition |
|---|---|---|---|---|---|---|---|---|---|---|---|---|
| | | C | Mn | Si | Ni | Co | Cr | Mo | V | −80° F. | 30° F. | |
| HP 231 | B17 | .16 | .62 | .26 | 8.4 | 4.1 | .59 | .60 | .07 | 22 | 48 / 30 | 1 / 2 |
| HP 232 | B16 | .22 | .50 | .18 | 8.5 | 4.1 | .56 | .60 | .07 | 29 | 34 / 36 | 1 / 2 |
| HP 233 | B15 | .21 | .57 | .21 | 8.5 | 4.1 | .60 | .60 | | 25 | 40 / 34 | 1 / 2 |
| HP 235 | B18 | .15 | 1.23 | .26 | 8.4 | 4.0 | .59 | .61 | .08 | 24 | 32 / 33 | 1 / 2 |
| HP 237 | B21 | .19 | .56 | .21 | 8.7 | 4.1 | <.1 | <.1 | .09 | 54 | 74 / 70 | 1 / 2 |
| HP 262 | B127 | .12 | .75 | .22 | 8.4 | 4.0 | 1.0 | .60 | .08 | 44 / 37 | 47 / 45 | 1 / 2 |
| HP 270 | B126 | .13 | .69 | .18 | 8.5 | 3.9 | .60 | .60 | .08 | 42 / 34 | 47 / 49 | 1 / 2 |
| HP 272 | B128 | .14 | .79 | .26 | 8.5 | 4.0 | 1.90 | 0.60 | 0.08 | 48 / 27 | 56 / 45 | (1) / (2) |
| HP 274 | B130 | .15 | .78 | .24 | 8.3 | 5.9 | .64 | .59 | .08 | 52 / 28 | 60 / 33 | (1) / (2) |
| HP 275 | B135 | .15 | .73 | .19 | 8.3 | 3.8 | 1.40 | .26 | .08 | 60 / 48 | 75 / 75 | (1) / (2) |
| HP 279 | B129 | .15 | .76 | .23 | 8.3 | 4.1 | 1.90 | .90 | .08 | 40 / 28 | 50 / 44 | (1) / (2) |
| HP 281 | B133 | .16 | .82 | .21 | 11.6 | 6.5 | 2.00 | 1.00 | .09 | 36 / 16 | 41 / 33 | (1) / (2) |
| HP 282 | B134 | .15 | .75 | .22 | 8.5 | 3.9 | 1.00 | | .08 | 50 / 6 | 61 / 11 | (1) / (2) |
| HP 283 | B136 | .15 | .78 | .24 | 8.9 | 3.9 | | .99 | .08 | 30 / 16 | 55 / 19 | (1) / (2) |

[1] As deposited.
[2] After stress relief.

With respect to the above compositions it will be noted that in HP 282 wherein molybdenum is absent and in HP 283 wherein chromium is absent, CVN reductions of 82 and 65 percent respectively at 30° F. are obtained, thus indicating extensive embrittling.

In all other heats, reductions range from 0 to 20 percent with the exception of HP 274 and HP 231. In HP 231, the resistance to embrittling is not as great as in each of HP 232, 233, 235 and 237, all of which have CR:Mo ratios at or near unity at Ni levels of 8.4–8.7. The relatively large reduction shown in HP 274 even with a Cr:Mo ratio greater than unity is probably due to a relatively high Co level.

In HP 275, increasing the Cr:Mo ratio to around 5:1 with a somewhat lower Co level results in no embrittlement at 30° F. Similar effects of Cr:Mo ratios greater than unity can be observed in HP 262 where Ni is employed at 8.4. In HP 272 with higher Cr (1.9) and higher Si (.26) as compared to HP 270 the results show a tolerable lowering of impact resistance and slightly lower tensile properties.

Many of the foregoing compositions exhibiting some degree of embrittling can be exposed for shorter times under stress-relief temperatures and will be substantially non-embrittling for a number of practical applications.

TABLE VII

| Weld No. | Y.S., K s.i. | T.S., K s.i. | R.A., percent | Elongation, percent in 1" | Weld condition |
|---|---|---|---|---|---|
| HP 231 | 177 | 203 | 55 | 19 | (1) |
| | 189 | 198 | 50 | 18 | (2) |
| HP 232 | 198 | 218 | 58 | 17 | (1) |
| | 192 | 199 | 44 | 15 | (2) |
| HP 233 | 185 | 203 | 58 | 17 | (1) |
| | 174 | 182 | 62 | 21 | (2) |
| HP 262 | 169 | 193 | 58 | 15 | (1) |
| | 179 | 183 | 64 | 18 | (2) |
| HP 270 | 174 | 189 | 59 | 18 | (1) |
| | 181 | 188 | 62 | 19 | (2) |
| HP 274 | 175 | 200 | 64 | 16 | (1) |
| | 186 | 194 | 61 | 18 | (2) |
| HP 275 | 177 | 201 | 63 | 16 | (1) |
| | 167 | 175 | 69 | 22 | (2) |
| HP 279 | 178 | 208 | 65 | 16 | (1) |
| | 187 | 211 | 64 | 17 | (2) |
| HP 281 | 167 | 218 | 59 | 17 | (1) |
| | 163 | 211 | 62 | 17 | (2) |
| HP 282 | 164 | 191 | 65 | 17 | (1) |
| | 166 | 192 | 61 | 18 | (2) |
| HP 283 | 183 | 203 | 56 | 17 | (1) |
| | 203 | 204 | 57 | 15 | (2) |

[1] As deposited.
[2] After stress relief.

Table VIII below shows results of testing on simulated weld metal alloy materials of various element concentrations from which it will be noted that in most cases essentially no embrittling is encountered while in some others, slight but tolerable reductions in impact resistance are obtained, thus indicating a high resistance to embrittling factors.

TABLE VIII

| Heat No. | Analysis | | | | | | | | As-cast | Impact (in. lbs.) 1,000° F. (24 hrs.) |
|---|---|---|---|---|---|---|---|---|---|---|
| | C | Mn | Si | Ni | Co | Cr | Mo | V | | |
| P977 | .17 | .92 | .16 | 10.3 | 4.2 | .90 | .54 | .16 | 53, 57 | 45, 52 |
| P978 | .17 | .49 | .15 | 10.4 | 4.3 | .86 | .51 | .10 | 52, 58 | 65, 89 |
| P980 | .17 | .49 | .15 | 10.4 | 2.1 | .89 | .44 | .16 | 45, 45 | 80, 86 |
| P987 | .18 | .62 | .35 | 10.4 | 1.9 | .94 | .43 | .09 | 49, 58 | 51, 62 |
| P988 | .18 | .80 | .16 | 10.6 | 3.5 | .81 | .47 | .09 | 60, 62 | 56, 61 |
| P989 | .19 | .71 | .14 | 8.7 | 4.0 | .79 | .44 | .09 | 53, 54 | 66, 77 |
| P990 | .15 | .57 | .36 | 10.4 | 5.8 | .84 | .45 | .09 | 50, 59 | 36, 44 |
| P991 | .17 | .57 | .37 | 11.8 | 3.8 | .84 | .43 | .09 | 66, 66 | 41, 42 |
| P994 | .18 | .54 | .34 | 10.4 | 4.1 | .78 | .40 | ---- | 64, 82 | 52, 101 |
| P995 | .18 | .54 | .14 | 10.3 | 3.9 | .78 | .40 | ---- | 61, 69 | 108, 109 |
| P996 | .18 | .54 | .14 | 10.4 | 3.8 | .78 | .43 | .06 | 64, 72 | 68, 68 |
| S8 | .16 | .59 | .15 | 10.3 | 3.9 | .83 | .43 | .12 | 64, 72 | 64, 70 |
| S10 | .15 | .62 | .32 | 10.0 | 1.9 | .82 | .45 | ---- | 80, 86 | 75, 89 |
| S11 | .15 | .62 | .32 | 10.0 | 1.9 | .82 | .45 | .10 | 68, 72 | 80, 91 |
| S12 | .15 | .62 | .32 | 10.0 | 1.9 | .82 | .45 | .16 | 65, 70 | 75, 85 |
| S13 | .14 | .60 | .31 | 9.9 | 3.7 | .80 | .44 | .16 | 68, 69 | 64, 71 |
| S26-3 | .15 | .58 | .25 | 10.3 | 4.4 | .82 | .40 | .08 | 50 | 56 |

What is claimed is:

1. A welded article comprising base metal components made of an alloy steel consisting essentially of about: 0.17 to 0.30% carbon, 7 to 9.5% nickel, 3.5 to 4.5% cobalt, 0.35 to 1.10% each of chromium and molybdenum, 0.1 to 0.35% manganese, up to 0.12% vanadium, up to 0.10% silicon, and the balance substantially all iron, said base metal components being welded together by an alloy consistnig essentially of about: 0.08 to 0.24% carbon, 8 to 12% nickel, 0 to 8% cobalt, 0.1 to 2.5% chromium, 0.1 to 1.25% molybdenum, 0 to 1.25% manganese, 0 to 0.40% silicon, and 0 to 0.30% vanadium, balance substantially iron and in the latter alloy, the ratio of Cr to Mo is greater than 1 to 1 when Ni is less than about 8.2 percent.

2. A welded article comprising base metal components made of an alloy steel consisting essentially of about: 0.17 to 0.30% carbon, 7 to 9.5% nickel, 3.5 to 4.5% cobalt, 0.35 to 1.10% each of chromium and molybdenum, 0.10 to 0.35% manganese, up to 0.12% vanadium, up to 0.10% silicon, and the balance substantially all iron, said base metal components being welded together by an alloy consistnig essentially of about: 0.08 to 0.24% carbon, 9.5 to 10.5% nickel, 0 to 8% cobalt, 0.1 to 2.5% chromium, 0.1 to 1.25% molybdenum, 0 to 1.25% manganese, 0 to 0.40% silicon, and 0 to 0.30% vanadium, balance substantially iron.

3. A welded article comprising base metal components made of an alloy steel consisting essentially of about: 0.17 to 0.30% carbon, 7 to 9.5% nickel, 3.5 to 4.5% cobalt, 0.35 to 1.10% each of chromium and molybdenum, 0.10 to 0.35% manganese, up to 0.12% vanadium, up to 0.10% silicon, and the balance substantially all iron, said base metal components being welded together by an alloy consistnig essentially of about: 0.08 to 0.24% carbon, 5 to 14% nickel, 0 to 8% cobalt, 0.1 to 2.5% chromium, 0.1 to 1.25% molybdenum, 0 to 1.25% manganese, 0 to 0.40% silicon, and 0 to 0.30% vanadium, balance substantially iron and in the latter alloy, the ratio of Cr to Mo is greater than 1 to 1 when Ni is less than about 8.2 percent.

References Cited

UNITED STATES PATENTS

| 2,184,518 | 12/1939 | Eash | 29—196.1 |
| 2,913,815 | 11/1959 | Muller | 29—196.1 |
| 3,079,677 | 3/1963 | Felmley | 29—196.1 |
| 3,163,501 | 12/1964 | Zimmer | 29—196.1 |

HYLAND BIZOT, Primary Examiner